(12) United States Patent
Gadkaree et al.

(10) Patent No.: US 8,252,716 B2
(45) Date of Patent: Aug. 28, 2012

(54) PROCESS FOR MAKING POROUS ACTIVATED CARBON

(75) Inventors: Kishor Purushottam Gadkaree, Big Flats, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/264,348

(22) Filed: Nov. 4, 2008

(65) Prior Publication Data

US 2010/0111811 A1 May 6, 2010

(51) Int. Cl.
*C01B 31/08* (2006.01)
(52) U.S. Cl. .............. 502/416; 423/445 R; 502/423; 502/424; 502/427
(58) Field of Classification Search .............. 423/445 R; 502/424, 426–427, 423
See application file for complete search history.

(56) References Cited

U.S. PATENT DOCUMENTS

| | | | | |
|---|---|---|---|---|
| 4,656,153 | A * | 4/1987 | Wennerberg | 502/182 |
| 4,753,717 | A * | 6/1988 | Yata et al. | 204/242 |
| 4,775,655 | A * | 10/1988 | Edwards et al. | 502/416 |
| 5,451,444 | A * | 9/1995 | DeLiso et al. | 428/116 |
| 5,882,621 | A * | 3/1999 | Doddapaneni et al. | 423/445 R |
| 6,156,697 | A * | 12/2000 | Gadkaree | 502/427 |
| 6,241,956 | B1 | 6/2001 | Saito et al. | 423/445 |
| 2002/0027305 | A1* | 3/2002 | Kibi et al. | 264/29.6 |
| 2002/0048144 | A1* | 4/2002 | Sugo et al. | 361/502 |
| 2003/0161781 | A1* | 8/2003 | Cabasso et al. | 423/445 R |
| 2005/0221981 | A1* | 10/2005 | Wagh et al. | 502/423 |
| 2007/0261557 | A1* | 11/2007 | Gadkaree et al. | 96/121 |

OTHER PUBLICATIONS

Devarly Prahas, Y. Kartika, N. Indraswati, S. Ismadji "Activated carbon from jackfruit peel waste by H3PO4 chemical activation: Pore structure and surface chemistry characterization". Chemical Engineering Journal vol. 140, Issues 1-3, Jul. 1, 2008, pp. 32-42 Online Sep. 4, 2007.*

Yulu Diao, W.P. Walawender, L.T Fan, Activated carbons prepared from phosphoric acid activation of grain sorghum, Bioresource Technology, vol. 81, Issue 1, Jan. 2002, pp. 45-52, ISSN 0960-8524, 10.1016/S0960-8524(01)00100-6. (http://www.sciencedirect.com/science/article/pii/S0960852401001006.*
Illan-Gomez et al., "Activated Carbons From Spanish Coals. 2. Chemical Activation", Energy & Fuels, 1996, 10, 1108-1114.
Treusch et al., "Basic Properties of Specific Wood-Based Materials Cabonised in a Nitrogen Atmosphere", Wood Sci Technol, 2004, 38, 323-333.
Cadek et al., "Bio-Based Materials for Supercapacitor", Carbon 2007 Program and Short Abstracts, The American Carbon Society—International Conference on Carbon, 2007.
Pandolfo et al., "Carbon Properties and Their Role in Supercapacitors", Journal of Power Sources 157, 2006, 11-27.
Ahmadpour et al., "The Preparation of Activated Carbon From Macadamia Nutshell by Chemical Activation", Carbon, 1997, vol. 35, No. 12, 1723-1732.
Tennison, "Phenolic-Resin-Derived Activated Carbons", Applied Catalysis A: General, 1998, 173, 289-311.
Teng et al., "Preparation of Porous Carbons From Phenol-Formaldehyde Resins With Chemical and Physical Activation", Carbon 38, 2000, 817-824.
Yue et al., "Preparation of Fibrous Porous Materials by Chemical Activation 2. H3PO4 Activation of Polymer Coated Fibers", Carbon 41, 2003, 1809-1817.
Ahmadpour et al., "The Preparation of Active Carbons From Coal by Chemical and Physical Activation", Carbon, 1996, vol. 34, No. 4, 471-479.
Yue et al., "Preparation of Fibrous Porous Materials by Chemical Activation 1. ZnCI2 Activation of Polymer-Coated Fibers", Carbon 40, 2002, 1181-1191.
Kadlec et al., "Structure of Pores of Active Carbons Prepared by Water-Vapour and Zinc-Dichloride Activation", Carbon, 1970, vol. 8, 321-331.

* cited by examiner

*Primary Examiner* — Stuart Hendrickson
*Assistant Examiner* — Richard M Rump
(74) *Attorney, Agent, or Firm* — Michael W. Russell

(57) ABSTRACT

A two-cycle thermal process for making porous activated carbon materials involves a first step of heating a mixture of a carbon precursor/chemical additive in a first heating cycle at a first temperature to cause gas liberation and volumetric expansion of the mixture, and heating the carbon material produced in the first step in a second heating cycle at a second temperature to carbonize and activate the carbon precursor. During the second cycle, essentially no gas liberation or volumetric expansion is observed.

18 Claims, No Drawings

PROCESS FOR MAKING POROUS ACTIVATED CARBON

BACKGROUND AND SUMMARY

The present invention relates to a process for making porous activated carbon and more specifically to a two-cycle carbonization/activation process for making porous activated carbon materials. The invention relates also to porous activated carbon made according to the inventive process.

Energy storage devices such as electric—also called electrochemical—double layer capacitors (EDLCs), a.k.a. supercapacitors or ultracapacitors may be used in many applications where a discrete power pulse is required. Such applications range from cell phones to electric/hybrid vehicles. An important characteristic of an energy storage device is the energy density that it can provide. The energy density of the device, which typically comprises one or more carbon-based electrode(s) separated by a porous separator and/or an organic or inorganic electrolyte, is largely determined by the properties of the carbon-based electrodes and, thus, by the properties of the carbon material used to form the electrodes.

Indeed, the performance of an energy storage device comprising carbon-based electrodes is largely determined by the physical and chemical properties of the carbon. Physical properties include surface area, pore size and pore size distribution, and pore structure, which includes such features as pore shape and interconnectivity. Chemical properties refer mainly to bulk and surface impurities, the latter relating particularly to the type and degree of surface functionalization.

Carbon electrodes suitable for incorporation into EDLCs are known. High performance carbon materials, which form the basis of such electrodes, can be made from natural and/or synthetic carbon precursors. For example, activated carbon can be made by initially heating a natural or synthetic carbon precursor in an inert environment at a temperature sufficient to carbonize the precursor. During the carbonization step, the carbon precursor is reduced or otherwise converted to elemental carbon.

Examples of suitable natural carbon precursors include coals, nut shells, woods, and biomass. Examples of suitable synthetic carbon precursors, which generally yield higher purity carbon material than natural carbon precursors, include polymers such as phenolic resins, poly(vinyl alcohol) (PVA), polyacrylonitrile (PAN), etc.

Following the process of carbonization, the carbonized material can be activated. During the activation step, the elemental carbon produced during the carbonization step is processed to increase its porosity and/or internal surface area. An activation process can comprise physical activation or chemical activation.

Physical activation is performed by exposing the carbonized material to steam or carbon dioxide ($CO_2$) at an elevated temperature, typically about 800-1000° C. Activation can also be carried out by using an activating agent other than steam or $CO_2$. Chemical activating agents such as phosphoric acid ($H_3PO_4$) or zinc chloride ($ZnCl_2$) can be combined with the carbonized material and then heated at a temperature ranging from about 500-900° C. In addition to phosphoric acid and zinc chloride, chemical activating agents may also include KOH, $K_2CO_3$, KCl, NaOH, $Na_2CO_3$, NaCl, $AlCl_3$, $MgCl_2$ and/or $P_2O_5$, etc.

As an alternative to performing the chemical activation on carbonized material (i.e., post-carbonization), one or more chemical activating agents can be combined with a carbon precursor in conjunction with a curing step prior to carbonization. In this context, curing typically comprises mixing a carbon precursor with a solution of a chemical activating agent and then heating the mixture.

By curing is meant a heating cycle that at least partially cross-links or polymerizes a carbon precursor to form a viscous or solid material. A cured carbon precursor that optionally comprises a chemical activating agent incorporated throughout its structure can be carbonized and activated. As used herein, a "heating cycle" comprises a heat-up step, a hold step, and a cool-down step, and the temperature associated with a heating cycle is the temperature to which a sample is heated during the hold step.

During a step of curing with a chemical activating agent, the carbon precursor and the chemical activating agent can be in the physical form of solid, solid powder, or solution before they are combined. If a solution is used, it is preferably an aqueous solution and the concentration can range from about 10-90 wt %. The carbon precursor and the chemical activating agent can be combined in any suitable ratio. The specific value of a suitable ratio depends on the physical form of the carbon precursor and the chemical activating agent and the concentration if one or both are in the form of solution. A ratio of carbon precursor to chemical activating agent on the basis of dry material weight can range from about 1:10 to 10:1. For example, the ratio can be about 1:1, 1:2, 1:3, 1:4, 1:5, 5:1, 4:1, 3:1, 2:1 or 1:1.

The curing step can comprise, for example, heating a carbon precursor/activating agent mixture at a temperature in the range of about 100-300° C. for a period of about 1-48 hours. During the heat-up, hold, and cool-down, the mixture is preferably maintained in a reducing or inert environment. One or more reducing gases (e.g., $H_2$, $H_2/N_2$ mixtures, CO) and/or one or more inert gases (e.g., $N_2$, He, Ar) can be used.

In embodiments where a chemical activating agent is used, it can be advantageous to homogeneously distribute the chemical activating agent throughout the carbon precursor at a molecular level prior to curing. In such a process, a chemical activating agent in the form of an aqueous solution can be combined with the carbon precursor. This molecular level mixing of the chemical activating agent can produce a homogeneous activated carbon that comprises a uniform distribution of physical characteristics (pore size, pore size distribution, and pore structure etc.).

As an alternative to combining an aqueous solution of a chemical activating agent with a carbon precursor, the chemical activating agent can be mixed with the carbon precursor in solid form.

Following carbonization/activation, the activated carbon product can be washed to remove both the activating agent and any chemical species derived from reactions involving the activating agent, dried and optionally ground to produce material comprising a substantially homogeneous distribution of nanoscale (and/or mesoscale) pores. The washing comprises washing the activated carbon material first with de-ionized water, then an aqueous acid solution, and then de-ionized water.

Activated carbon produced by this method offers significantly higher energy storage capacity in EDLCs compared to major commercial carbons. In addition to its use in energy storage devices, such activated carbon can be used as a catalyst support or as media for adsorption/filtration.

Whether a chemical activating agent is combined with a carbon precursor in solid form or using an aqueous solution of the chemical activating agent, the cured mixture is conventionally carbonized and activated in a single heating cycle. This so called "one-cycle" process is simple and convenient. However, aspects of such a "one-cycle" carbonization/activation process may limit large-scale production of activated carbon material due to economic considerations.

Particularly in embodiments where sodium or potassium salts or bases are used as the chemical activating agent, a large volume of gas can be generated by various chemical reactions that occur at intermediate temperatures during the carbonization/activation heating cycle. The large gas volume can cause foaming of the intermediate product, resulting in a volume expansion of a factor as high as 30-40. This gas production and the concomitant foaming effectively limit the amount of starting material that can be processed in a furnace of a given volume.

When using a chemical activating agent comprising a sodium or potassium salt or base, an additional consideration is the possibility that elemental sodium or potassium can be produced as a by-product of reactions between organic molecules (and/or organic functional groups on carbon) and the activating agent. Metallic sodium and metallic potassium are each very reactive and can explode when exposed to air or moisture. Because these alkaline metals can vaporize and re-deposit in the furnace during the elevated processing temperatures associated with carbonization/activation, the furnace should be built corrosion-resistant and configured to ensure safe operation. This will further increase equipment cost and capital investment.

When taken together, these two factors may limit the utilization of furnace capacity and capital investment. On the one hand, out-gassing during carbonization/activation suggests that larger volume furnaces would be useful in order to accommodate the foamed carbon precursor. On the other hand, the formation of alkaline metals such as sodium or potassium during carbonization/activation suggests that these (larger) furnaces should be fitted with additional features to properly address corrosion and hazard concerns, which adversely affects cost.

In view of the foregoing, it would be an advantage to provide a process for producing activated carbon that enables a more efficient utilization of capital investment while maintaining the attributes of the resulting carbon material.

These and other aspects and advantages of the invention can be accomplished by dividing the thermal processing associated with carbonization/activation into two consecutive heating cycles. According to such a "two-cycle" process, a first cycle comprises heating a mixture of a carbon precursor and a chemical additive at a first (intermediate) temperature, followed by a second cycle in which the material derived from the first cycle is heated at a second (elevated) carbonization/activation temperature. In one aspect, the mixture heated in the first cycle comprises a cured mixture.

During the first cycle, essentially all of the foaming is complete but sodium and/or potassium, if used, is not converted to metallic form in significant amount and does not volatize significantly. Thus, the first cycle can be carried out in a large, relatively low-cost furnace. During the second cycle, although there may be volatilization of sodium or potassium, there is no substantial volume expansion of the carbon precursor. Thus, a smaller, specially-equipped furnace can be used during the second cycle.

This two-cycle process allows efficient utilization of capital equipment, which can translate into significant savings in production cost. It has been demonstrated that the EDLC performance of the resulting carbon material is essentially the same as that of carbon produced in the one-cycle process.

Additional features and advantages of the invention will be set forth in the detailed description which follows, and in part will be readily apparent to those skilled in the art from that description or recognized by practicing the invention as described herein, including the detailed description which follows and the claims.

It is to be understood that both the foregoing general description and the following detailed description present embodiments of the invention, and are intended to provide an overview or framework for understanding the nature and character of the invention as it is claimed.

DETAILED DESCRIPTION

The invention relates generally to a two-cycle thermal process for making porous activated carbon materials. Specifically, the process disclosed herein enables cost effective production of porous activated carbon at large scales by dividing the carbonization/activation process into two separate, consecutive heating cycles. The process advantageously begins with a cured mixture of a synthetic carbon precursor and an activating agent. According to one embodiment, the mixture is heated in a first furnace in a first cycle at a first (intermediate) temperature that is effective to cause substantial completion of gas liberation from the mixture and substantially all of the volume expansion thereof During the first cycle, the material being processed is not significantly reactive or corrosive (i.e., no substantial amount of an alkaline metal is produced).

A second cycle is then carried out in a second furnace at a second (elevated) temperature that is effective to carbonize and activate the carbon precursor. During the second cycle, corrosive and/or reactive products may be formed but, advantageously, there is essentially no further gas liberation or volume expansion of the reactants.

In embodiments, the first step can comprise heating cured carbon precursor at a temperature in the range of about 350-600° C. for a period of about 0.5-10 hours. The second step can comprise heating the material derived from the first step at a temperature in the range of about 650-1000° C. for a period of about 0.5-10 hours. The heating and cooling rates for both the first step and the second steps can range from about 10-600° C./hr. Advantageously, both heating cycles are performed using an inert or reducing environment. As used herein, when referring to a range of values, the modifier "about" refers to both values in the range. Thus, by way of a clarifying example, disclosure of a temperature in the range of about 350-600° C. means a temperature in the range of about 350° C. to about 600° C.

Due to the large volume expansion in the first cycle, only a limited mass of material can be processed in a given furnace. However, because the processing involves only moderate temperatures and the furnaces do not require expensive anti-corrosion or hazard abatement features, relatively inexpensive furnaces can be used.

Furnaces used in the second cycle are advantageously high temperature units that are corrosion resistant and include desirable safety features. Such features incorporated into the second cycle furnaces increase the cost of these units. However, because there is no substantial volume expansion during the second cycle, a much larger mass of material can be processed per unit volume of furnace capacity.

Overall, the additional step in the "two-cycle" process allows more efficient utilization of capital equipment and lowers production cost. Moreover, as disclosed herein, the EDLC performance of the resulting carbon material is not compromised compared to that of carbon produced in a one-cycle process.

After the two-cycle process, the resulting activated carbon material can be optionally ground to a desired particle size and then washed in order to removed retained chemical activating agent as well as any chemical by-products derived from reactions involving the chemical activating agent.

Washing comprises initially rinsing the activated carbon material with de-ionized water, then rinsing with an acid solution, and finally rinsing again with de-ionized water. This washing process can reduce residual alkali content in the carbon to less than about 200 ppm (0.02 wt. %), compared with values greater than about 3 wt. % obtained with conventional extraction processes. Further, compared with conventional extraction processes, the instant washing process reduces total waste volume by about 65%, is performed at room temperature and ambient pressure, and has the benefit of shorter process times.

EXAMPLES

The invention will be further clarified by the following examples. By way of comparison, a one-cycle process for making porous activated carbon is initially described below.

In an exemplary conventional one-cycle process, an aqueous solution of KOH (45 wt. %) and an aqueous phenolic resin (Georgia Pacific GP® 510D34) are mixed in a ratio of 3:1 by weight. The resin is cured by heating in an oven at 125° C. for 24 hours and then at 175° C. for 24 hours to obtain a sponge-like solid with a dull to brown-yellow color. The atmosphere in the oven is ambient air.

The cured resin is broken into small pieces by mechanical force. A known amount (e.g., 250 grams) is placed in a graphite crucible and loaded in a retort furnace (CM Furnaces, Model 1216FL) for carbonization/activation. The furnace temperature is increased at a rate of 200° C./hr to 800° C., held constant at 800° C. for 2 hours, and then cooled down naturally. Throughout the heating cycle, the furnace is purged with $N_2$.

Once the furnace temperature has dropped to ambient temperature, the $N_2$ purge is saturated with water vapor by bubbling the $N_2$ through hot deionized (DI) water. This step of introducing water-saturated $N_2$ to the furnace interior allows any metallic potassium that has been produced during the heating cycle to react with water vapor and form KOH. Without this step, metallic potassium could self-ignite and possibly explode when exposed to oxygen.

The $N_2$/water vapor purge is continued for 3 hours before the furnace is opened and unloaded. The activated carbon product can then be washed in DI water and/or steam to remove excess activating agent and activating agent by-products from the activated carbon. Finally, the activated carbon can be dried (e.g., overnight at 110° C. in a vacuum oven) and ground to the desired particle size (typically several micrometers).

In the above carbonization/activation process, various gases (including water, hydrogen, methane, carbon dioxide, carbon monoxide, and various volatile organic compounds) are generated from decomposition of organic molecules and their reactions with KOH and other derived potassium species.

A hot-stage microscope was used to directly monitor the evolution of a 3:1 KOH:phenolic resin mixture during the carbonization/activation heating cycle. It was observed that the mixture starts to soften or melt over a temperature range of 315-320° C., while gas bubbles start to evolve and permeate the viscous molten material over a temperature range of about 320-325° C. The gas bubble evolution results in significant foaming and volume expansion. At a temperature of about 370° C., however, gas bubble generation starts to slow down. At a temperature of about 410° C. and higher, no additional bubbling/foaming is observed, and the treated material is transformed into a rigid solid whose shape and volume are maintained through the rest of the heating cycle. Based on the above observations, it is believed that gas bubbles escaping through the viscous molten material in the intermediate temperature range of 320-410° C. are responsible for the foaming and volume expansion of the material.

During one experiment, a typical cured batch (250 grams of cured 3:1 KOH:phenolic resin), which had a total volume of about 400 mL expanded to a volume of about 14000 mL (~35 times the starting volume) after carbonization/activation. After washing and drying, approximately 40 grams of carbon was produced.

In addition to the outgassing and foaming, which occur primarily over a temperature range of 320-410° C., at higher temperatures a portion of the potassium compounds can be converted to metallic potassium (boiling point 759° C.), which can vaporize and re-deposit inside the furnace and in the vent tubes. The production of metallic potassium (or metallic sodium, if a sodium-containing activating agent is used) may cause significant corrosion to the furnace and the corroded materials from the furnace can, in turn, contaminate the carbon material. On the other hand, these alkali metals pose a safety hazard due to their reactive nature.

Lowering the maximum carbonization/activation temperature could alleviate the corrosion and safety issues, but it has been demonstrated that carbon made at lower temperatures tend to yield inferior performance in EDLCs. Therefore, the furnace used for carbonization/activation is advantageously constructed to withstand such corrosion and to handle the safety hazard, which can increase equipment cost substantially. It would be desirable to process as much material as possible in a furnace of a given size, but the volume expansion limits the amount of material that can be processed.

Based on the fact that essentially all the foaming and volume expansion take place at temperatures below about 410° C., the inventive method involves the following two-cycle carbonization/activation process while maintaining all other process steps the same as described above.

In the first cycle, the cured KOH:phenolic resin mixture is heated at a temperature that is above 410° C. but well below the boiling point of metallic potassium (or metallic sodium, if a sodium-containing activating agent is used). This allows substantially all the foaming and volume expansion to be complete during the first cycle while minimizing the production and vaporization of metallic potassium. Thus, the first cycle can be run in a relatively inexpensive furnace without the stringent requirements of corrosion resistance and safety features. After the first cycle, the intermediate material, which comprises a foamed carbon precursor that is at least partially converted to carbon, can be ground into a powder that occupies a volume similar to that of the starting cured material. Grinding of the intermediate material can be carried out using any suitable apparatus such as a ball mill. The ground powder can then be processed through a second heating cycle at a suitable carbonization/activation temperature.

The two-cycle process was demonstrated in the following experiment. A 3:1 KOH:phenolic resin mixture was cured in the manner described above. A known quantity (25 grams) of the cured mixture was initially processed through a first heating cycle in a first furnace in which the furnace temperature was increased at 200° C./hr to 460° C., held at 460° C. for 2 hours, and then cooled down naturally. The resulting (volume-expanded) material was ground into a powder, the volume of which was about the same as that of the cured mixture prior to the first cycle.

The powder product from the first cycle was then processed through a second cycle in a second furnace, in which the furnace temperature was increased at 200° C./hr to 800° C., held at 800° C. for 2 hours, cooled down naturally, and finally purged with $N_2$ saturated with water vapor for 3 hours. During the second heating cycle, there was no measurable volume expansion.

The resulting activated carbon material was washed to remove KOH and other derived potassium compounds. The washing comprised initially soaking the activated carbon in 1 L of DI water for a few minutes, after which it was filtered, soaked in 50 mL of a 37% HCl aqueous solution for an hour, filtered, and then washed repeatedly with DI water until the pH of the effluent was the same as that of the DI water. In addition to or in lieu of HCl for the acid wash, other acids such as $H_2SO_4$ can be used.

Washing first with DI water removes a majority of the alkaline species such as KOH and $K_2CO_3$ that may otherwise adversely interact with the acid wash to generate excess heat, gas and carbon dust. This also allows recycling of such alkaline species as KOH and $K_2CO_3$ before they react with the acid. The activated carbon was finally dried overnight at 110° C. in a vacuum oven and ground to a desired particle size (typically several micrometers).

Carbon samples obtained from both the one-cycle process and the inventive two-cycle process were tested in button cells for EDLC performance. In these tests, a 1.5 M solution of tetraethylammonium tetrafluoroborate in acetonitrile was used as the electrolyte and the button cells were charged to 2.7V. Capacitive data are shown in Table 1, where each data point represents the average of two measurements.

As shown in Table 1, the gravimetric specific capacitance (GSC) and the volumetric specific capacitance (VSC) of button cells comprising carbon electrodes made using the comparative one-cycle process and the inventive two-cycle process are essentially equal. Notably, the two-cycle process does not adversely affect the capacitive properties of electrodes made using the activated carbon material.

TABLE 1

Capacitance data for activated carbon prepared using a one-cycle and a two-cycle carbonization/activation process

| Carbonization/Activation Process | GSC [F/g] | VSC [F/cc] |
| --- | --- | --- |
| One-cycle (comparative) | 192.5 | 99.3 |
| Two-cycle | 186.0 | 100.2 |

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of making porous activated carbon comprising,
in a first heating cycle, heating a mixture of a carbon precursor selected from the group consisting of a synthetic polymer thermosetting resin and a synthetic polymer thermoplastic resin, and a chemical activating agent in a first furnace at a temperature in a range of about 350° C. to 600° C. to form an intermediate carbon product, where a ratio of the carbon precursor to the chemical activating agent on a basis of dry material weight is from about 1:10 to 10:1;
in a second heating cycle, heating the intermediate carbon product in a second furnace at a temperature in a range of about 650° C. to 1000° C. to form an activated porous carbon, wherein the second furnace is a corrosion-resistant furnace that is smaller than the first furnace.

2. The method according to claim 1, wherein the carbon precursor is selected from the group consisting of phenolic resins, poly(vinyl alcohol), and polyacrylonitrile.

3. The method according to claim 1, wherein the chemical activating agent is selected from the group consisting of $P_2O_5$, $ZnCl_2$, KOH, $K_2CO_3$, NaOH, $Na_2CO_3$, $AlCl_3$, $MgCl_2$ and $H_3PO_4$.

4. The method according to claim 1, further comprising forming the carbon precursor/chemical activating agent mixture by mixing the carbon precursor with an aqueous solution of the chemical activating agent.

5. The method according to claim 1, wherein prior to the first heating cycle the carbon precursor/chemical activating agent mixture is heated at a temperature in a range of about 100° C. to 300° C. for a period of about 1-48 hours in order to cure the carbon precursor.

6. The method according to claim 1, wherein the intermediate carbon product is cooled to about room temperature prior to the second heating cycle.

7. The method according to claim 1, wherein the intermediate carbon product comprises a foamed carbon precursor that is at least partially converted to carbon.

8. The method according to claim 1, wherein after the first heating cycle but prior to the second heating cycle the intermediate carbon product is ground to form a powder.

9. The method according to claim 1, wherein substantially no volume expansion of the intermediate carbon product occurs during the second heating cycle.

10. The method according to claim 1, wherein the first heating cycle and the second heating cycle are performed in an inert or reducing atmosphere.

11. The method according to claim 1, wherein the second furnace is purged with $N_2$ saturated with water vapor prior to removing the porous activated carbon from the second furnace.

12. The method according to claim 1, further comprising washing the porous activated carbon.

13. The method according to claim 12, wherein the washing comprises the sequential acts of:
washing the porous activated carbon with de-ionized water;
washing the porous activated carbon with an aqueous acid solution; and
washing the porous activated carbon with de-ionized water,
wherein the second washing with a source of de-ionized water is carried out until the effluent has a pH substantially equal to the source of de-ionized water.

14. The method according to claim 13, wherein a wash effluent from the first washing with a source of de-ionized water is recycled.

15. A method of making porous activated carbon comprising,
in a first heating cycle, heating a mixture of a carbon precursor and a chemical activating agent in a first furnace at a temperature in a range of about 350° C. to 600° C. to form an intermediate carbon product;
in a second heating cycle, heating the intermediate carbon product in a corrosion-resistant second furnace at a temperature in a range of about 650° C. to 1000° C. to form an activated porous carbon, and further comprising washing the porous activated carbon, wherein the washing comprises the sequential acts of:

washing the porous activated carbon with de-ionized water;

washing the porous activated carbon with an aqueous acid solution;

washing the porous activated carbon with de-ionized water, drying the porous activated carbon after washing; and grinding the dried porous activated carbon into a powder, wherein the second furnace is smaller than the first furnace and the second washing with a source of de-ionized water is carried out until the effluent has a pH substantially equal to the source of de-ionized water.

16. A method of making porous activated carbon comprising, in a first heating cycle, heating a mixture of a carbon precursor and a chemical activating agent in order to cure the carbon precursor;

in a second heating cycle, heating the cured carbon precursor in a first furnace at a temperature in a range of 350° C. to 600° C. to form an intermediate carbon product; and in a third heating cycle, heating the intermediate carbon product in a second furnace at a temperature in a range of 650° C. to 1000° C. to activated the intermediate carbon product and form an activated porous carbon, wherein the second furnace is a corrosion-resistant furnace that is smaller than the first furnace.

17. The method according to claim 16, further comprising washing the porous activated carbon at room temperature and ambient pressure.

18. The method according to claim 1, wherein the mixture comprises a ratio of carbon precursor to chemical activating agent of from about 4:1 to 2:1 on the basis of dry material weight.

\* \* \* \* \*